(12) United States Patent
Hongo

(10) Patent No.: US 7,373,061 B2
(45) Date of Patent: May 13, 2008

(54) LASER ENERGY TRANSMISSION OPTICAL FIBER, LASER ENERGY TRANSMISSION METHOD AND LASER ENERGY TRANSMISSION DEVICE

(75) Inventor: Akihito Hongo, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 11 days.

(21) Appl. No.: 11/339,634

(22) Filed: Jan. 26, 2006

(65) Prior Publication Data

US 2006/0165361 A1 Jul. 27, 2006

(30) Foreign Application Priority Data

Jan. 27, 2005 (JP) .............................. 2005-019481

(51) Int. Cl.
*G02B 6/032* (2006.01)
(52) U.S. Cl. ...................................... 385/125
(58) Field of Classification Search ............... None
See application file for complete search history.

(56) References Cited

U.S. PATENT DOCUMENTS

| | | | | |
|---|---|---|---|---|
| 3,973,828 A | * | 8/1976 | Onoda et al. ............... | 385/125 |
| 4,917,083 A | * | 4/1990 | Harrington et al. ........... | 606/15 |
| 5,221,308 A | * | 6/1993 | Krohn et al. .................. | 65/393 |
| 5,815,627 A | * | 9/1998 | Harrington .................. | 385/125 |
| 6,404,966 B1 | | 6/2002 | Kawanishi | |
| 2002/0106164 A1 | * | 8/2002 | Sasaoka et al. ............... | 385/70 |
| 2004/0151454 A1 | * | 8/2004 | Fajardo et al. .............. | 385/126 |
| 2004/0247271 A1 | * | 12/2004 | Skovgaard et al. ......... | 385/125 |
| 2005/0025965 A1 | * | 2/2005 | Sanghera et al. ........... | 428/364 |
| 2006/0098694 A1 | * | 5/2006 | Hongo .......................... | 372/6 |

FOREIGN PATENT DOCUMENTS

| GB | 2 350 904 A | 12/2000 |
|---|---|---|
| JP | 2000-35521 | 2/2000 |
| JP | 2002-541507 | 12/2002 |

OTHER PUBLICATIONS

K. Iwai, et al., "Penetration of high-intensity Er:YAG laser light emitted by IR hollow optical fibers with sealing caps in water", App. Opt., vol. 43, pp. 2568-2571, (Apr. 2004).

* cited by examiner

*Primary Examiner*—Rodney Bovernick
*Assistant Examiner*—Mike Stahl
(74) *Attorney, Agent, or Firm*—McGinn IP Law Group, PLLC

(57) ABSTRACT

A laser energy transmission optical fiber having an optical fiber main body which has a hollow-core region with a diameter greater than a wavelength of transmitted light, an inner clad region which has a solid portion with plurality of holes formed therein, and an outer clad region formed surrounding the inner clad region. The outer clad region has a refractive index lower than the solid portion of the inner clad region.

12 Claims, 4 Drawing Sheets

- 30 SILICA OPTICAL FIBER
- 32 CLAD REGION
- 31 CORE REGION

- 40 HOLLOW FIBER
- 43 METAL LAYER
- 42 DIELECTRIC LAYER
- 41 HOLLOW-CORE REGION

US 7,373,061 B2

LASER ENERGY TRANSMISSION OPTICAL FIBER, LASER ENERGY TRANSMISSION METHOD AND LASER ENERGY TRANSMISSION DEVICE

The present application is based on Japanese patent application No. 2005-019481, the entire contents of which are incorporated herein by reference.

BACKGROUND OF THE INVENTION

1. Field of the Invention

This invention relates to an optical fiber for transmitting laser energy and, in particular, to an optical fiber that is suited to transmit high-output laser light with an infrared wavelength band which is useful for medical applications. This invention also relates to a laser energy transmission method and a laser energy transmission device using the optical fiber.

2. Description of the Related Art

In recent years, according as semiconductor lasers or solid-state lasers are provided with a higher output or shorter pulse, various uses have been developed using laser energy with high peak power. Especially, the use for laser processing or a laser surgery attracts attention.

Conventionally, a silica optical fiber 30 with a large diameter as shown in FIG. 1 is generally used to transmit a high output laser light. It is structured such that, like optical fibers as used for communications, the laser light is transmitted concentrating its optical power in a core region 31 while satisfying the total internal reflection condition at the boundary of the core region 31 with a relatively high refractive index and a clad region 32 with a low refractive index.

In general, such a silica solid-type optical fiber can transmit a laser light of about 2 μm or less wavelength at a low loss. The silica solid-type optical fiber for high power transmission is different from the general optical fibers for communications in that single-mode transmission is not needed and the power density of transmitted laser light is reduced using a large core with a diameter of 100 to 600 μm. Since the silica solid-type optical fiber can transmit a laser light of about 2 μm or less wavelength at a low loss for a long distance, it is mainly used to transmit a neodymium (Nd)—YAG laser light (with a wavelength of 1.06 μm) which has high oscillation efficiency and high output, and it is in practical use for a laser processing or as a laser surgery for hemostasis. On the other hand, a holmium (Ho)-YAG laser light (with a wavelength of 2.1 μm) can be barely transmitted using the silica solid-type optical fiber for a distance of less than a few meters. The Ho-YAG laser light is taken into account mainly for medical use since it has a relatively high absorption to water.

When the wavelength of laser light is more than 2 μm, the silica solid-type optical fiber cannot be used for a long distance transmission. An erbium chrome (ErCr)-YSGG (=Yttrium Scandium Gallium Garnet: $Y_3Sc_2Ga_3O_{12}$) laser light (with a wavelength of 2.78 μm) and an erbium (Er)-YAG laser light (with a wavelength of 2.94 μm) are effective for cutting of a hard tissue such as a bone or teeth since they are well absorbed especially by water, e.g., very efficiently absorbed by a hydration shell between hydroxyapatite crystals. However, the laser light with a wavelength near 3 μm cannot be transmitted through the silica solid-type optical fiber. Therefore, a hollow fiber with a hollow region as a core is used therefor.

As shown in FIG. 2, the hollow fiber 40 comprises a hollow-core region 41, a dielectric layer 42 defining the hollow-core region 41 inside thereof, and a metal layer 43 formed surrounding the dielectric layer 42. The thickness of the dielectric layer 42 is optimized according to a wavelength of transmitted laser light to enhance the reflectivity of the inside wall to allow a low-loss transmission. It is mainly applied to laser therapy equipment for dentistry.

The related art of the invention is, for example, JP-A-2000-35521 and JP-A-2002-541507.

In general, the silica optical fiber is sufficiently transparent to light with a wavelength of less than 2 μm and is operable to transmit it at a low loss for a long distance. However, even in the case of a laser light with a wavelength of less than 2 μm such as a titanium (Ti)-sapphire laser light of a wavelength near 0.8 μm and a neodymium (Nd)-YAG laser light of 1.06 μm wavelength, the core region may be broken since its peak power can be extremely increased spatially and temporally when the laser light has a high output and short pulse. This is because, due to an increase in laser energy by nonlinear optical effect, the refractive index increases to allow the self-focusing of light.

Therefore, as shown in FIG. 1, the conventional laser energy transmission optical fiber needs to have the enlarged core diameter such that it can be used within such a power density as not to exceed a breakage threshold of the optical fiber. Thus, there is a problem that the conventional laser energy transmission, optical fiber is subjected to a limitation in transmission capacity of laser energy and in mechanical flexibility.

In recent years, a concept has been suggested that, in the case of a laser light with a very high power density as described above, a hollow core is advantageous to transmit the laser light even when its wavelength is 2 μm or less. This is because the breakage threshold of end face can be significantly enhanced without using the enlarged diameter. A transmission line suited for this concept is a photonic bandgap fiber that has a hollow central portion with plural holes formed outside thereof. The photonic bandgap fiber can have a bandgap to a specific wavelength depending on the hole diameter and the interval between the holes to offer a low-loss transmission while confining light in its hollow-core region.

However, since the bandgap is designed to be formed to a specific wavelength band to allow the low-loss transmission of a specific wavelength laser light such as a Nd-YAG laser light, laser light in another wavelength band cannot be always transmitted at a low loss. In practice, a visible laser light such as green or red light needs to be superposed as a guide light since the Nd-YAG laser light is invisible. Thus, although the conventional photonic bandgap fiber is excellent in transmission of only the specific laser light, it is not suited to transmit a visible light as the guide light together with the laser light.

On the other hand, in the case of an ErCr-YSGG laser light or Er-YAG laser light, the hollow fiber with the dielectric formed inside thereof (herein also called dielectric-formed hollow fiber) as shown in FIG. 2 is used since it is not possible to use the solid-type silica optical fiber. Also in this case, the visible light needs to be transmitted being superposed as the guide light. However, since the thickness of the dielectric layer 42 is set to allow the low-loss transmission of the specific infrared laser light, a large loss occurs in the visible laser light. When it is transmitted a few meters, the output of guide light may be recognized but a laser light source with high power needs to be used therefor.

As described earlier, laser light with a wavelength near 3 µm is well absorbed by water and, therefore, it is an important light source for medical use. Especially, a laser therapy intended to minimally invasive treatment attracts attention recently. In this use, the dielectric-formed hollow fiber with a diameter of about 500 to 1000 µm is generally used since it is difficult to make it a very narrow fiber with a diameter of about 100 µm.

Since the dielectric-formed hollow fiber has the hollow core, when its tip accesses or contact the affected part or it is inserted into the body, deterioration in optical or mechanical characteristics may occur such as an invasion of foreign material into the hollow-core region, an increase in loss due to the contamination of the tip portion and a breakage failure. Further, since it is difficult to clean or sterilize, it is not possible to reuse it.

A suggested solution for sealing the hollow part is attachment of a silica end chip to prevent the invasion of foreign material and to control the spread angle or direction of light outputted (K. Iwai, Y. Shi, M. Endo, K. Ito, Y. Matsuura, M. Miyagi and H. Jelinkove, App. Opt., vol. 43, pp. 2568-2571, 2004). It is structured such that the tip of the dielectric-formed metallic hollow fiber 40 is covered with the end chip, like a cap, to seal the hollow-core region 41. Since the dielectric-formed metallic hollow fiber 40 is composed of metal and dielectric film, the chip cannot be integrated by fusion-bonding. Therefore, the tip portion needs to be enlarged and the chip may fall off when the fiber is inserted into the affected part.

SUMMARY OF THE INVENTION

It is an object of the invention to provide a laser energy transmission optical fiber that can have a significantly high breakage threshold to a high-output and short-pulse laser light with extremely high peak power defined spatially or temporally, and that can, at a low loss, transmit a visible guide light superposed for a long distance.

Also, it is an object of the invention to provide a laser energy transmission optical fiber that can be suitably applied to the medical use, wherein deterioration in the fiber characteristics thereof can be suppressed even when the tip of the fiber accesses or contact the affected part or it is inserted into the body, and the fiber can be easy cleaned and sterilized.

It is another object of the invention to provide a laser energy transmission method and a laser energy transmission device using the laser energy transmission optical fiber.

(1) According to one aspect of the invention, a laser energy transmission optical fiber comprises:

an optical fiber main body that comprises a hollow-core region comprising a diameter greater than a wavelength of transmitted light, an inner clad region comprising a solid portion with plurality of holes formed therein, and an outer clad region formed surrounding the inner clad region, wherein the outer clad region comprises a refractive index lower than the solid portion of the inner clad region.

In the above invention, the following modifications and changes can be made.

(i) The solid portion of the inner clad region comprises pure silica, and the outer clad region comprises a fluorine-containing silica material or a fluorine-containing resin material.

(ii) The plurality of holes are set to have a diameter and an interval therebetween such that a predetermined bandgap is defined relative to the wavelength of transmitted light.

(iii) The laser energy transmission optical fiber further comprises: a solid-core type optical fiber that is connected to one or both ends of the optical fiber main body, wherein the solid-core type optical fiber comprises a clad region, and a solid-core region comprising a refractive index greater than the clad region.

(iv) The solid-core region comprises a diameter nearly equal to that of the inner clad region.

(2) According to one aspect of the invention, a laser energy transmission method comprises:

providing the laser energy transmission optical fiber as defined in above (1);

transmitting a laser light of the infrared wavelength band to a 4 µm or less wavelength while confining optical energy of the laser light mainly in the hollow-core region; and concurrently transmitting a visible laser light of a 0.7 µm or less wavelength while confining the visible light in the hollow-core region or inner clad region.

In the above invention, the following modifications and changes can be made.

(v) The laser light comprises a titanium-sapphire (Ti-sapphire) laser light, a neodymium-YAG (Nd-YAG) laser light, a holmium-YAG (Ho-YAG) laser light, an erbium-YAG (Er-YAG) laser light, or an erbium chrome-YSGG (ErCr-YSGG) laser light.

(vi) The visible laser light comprises a semiconductor laser light, or a helium-neon (He—Ne) laser light.

(3) According to one aspect of the invention, a laser energy transmission device comprises:

the laser energy transmission optical fiber as defined above (1);

a first laser light source that is operable to oscillate a laser light of the infrared wavelength band to a 4 µm or less wavelength;

a second laser light source that is operable to oscillate a visible laser light of a 0.7 µm or less wavelength.

In the above invention, the following modifications and changes can be made.

(vii) The first laser light source comprises a titanium-sapphire (Ti-sapphire) laser light source, a neodymium-YAG (Nd-YAG) laser light source, a holmium-YAG (Ho-YAG) laser light source, an erbium-YAG (Er-YAG) laser light source, or an erbium chrome-YSGG (ErCr-YSGG) laser light source.

(viii) The second laser light source comprises a semiconductor laser light source, a helium-neon (He—Ne) laser light source.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 3:
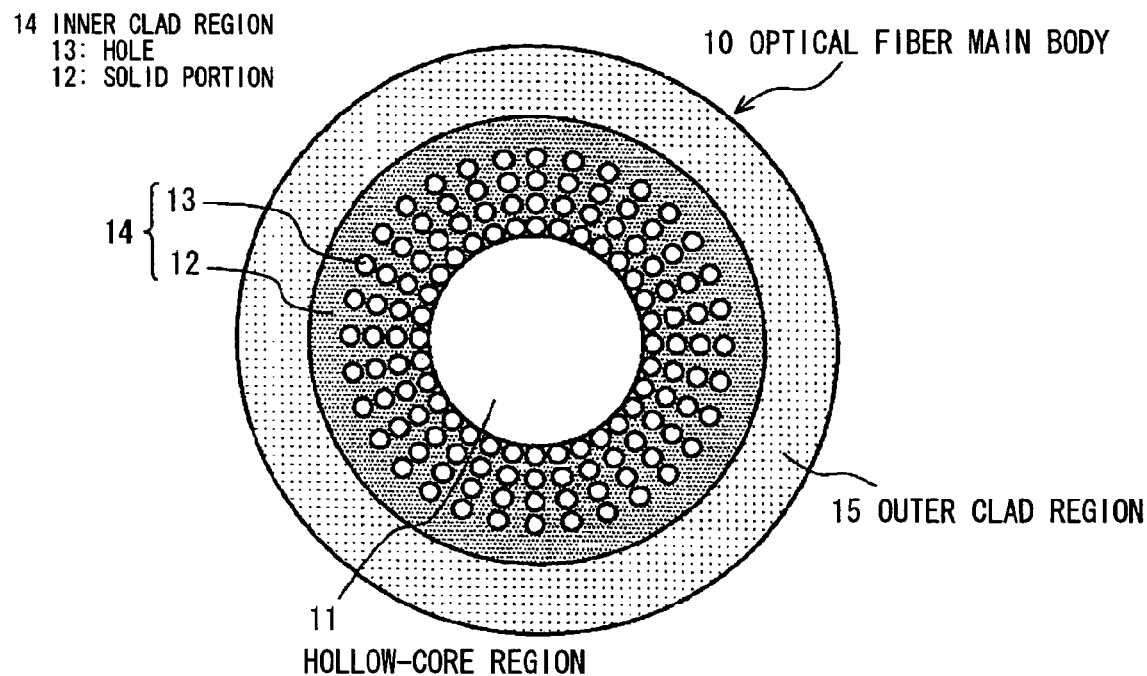
FIG. 3 is a cross sectional view showing a laser energy transmission optical fiber in a first preferred embodiment according to the invention.

FIG. 3 is a cross sectional view showing a laser energy transmission optical fiber in the first preferred embodiment according to the invention.

The laser energy transmission optical fiber of this embodiment is a hollow-core type optical fiber and comprises an optical fiber main body 10. In detail, as shown in FIG. 3, the optical fiber main body 10 comprises a hollow-core region 11, an inner clad region 14 formed surrounding the hollow-core region 11, and an outer clad region 15 formed surrounding the inner clad region 14. The hollow-core region 11 has an inside diameter greater than a wavelength of transmitted light. The inner clad region 14 has a solid portion 12 with plural holes 13 formed therein.

The plural holes 13 are arranged such that the holes are on plural concentric circles, the holes of same number are formed at equal intervals on each circle, and the holes are aligned in its radial direction. By thus arranging the holes 13, the inner clad region 14 can have a periodicity in refractive index. The holes 13 are set to have a diameter and an interval between the adjacent holes such that a predetermined bandgap is defined relative to a wavelength of transmitted light.

The laser energy transmission optical fiber of this embodiment is featured in that the outer clad region 15 is made of a material that has a refractive index lower than the solid portion 12 of the inner clad region 14.

For example, it is preferred that the solid portion 12 of the inner clad region 14 is made of pure silica and the outer clad region 15 is made of a silica material containing fluorine, which has a refractive index lower than the pure silica.

In this embodiment, a laser energy transmission method is conducted by using the above laser energy transmission optical fiber to transmit a high-energy laser light of the infrared wavelength band to a 4 µm or less wavelength and a visible laser light of a 0.7 µm or less wavelength. The visible laser light is transmitted as a guide light of the invisible high-energy laser light.

In this embodiment, a Nd-YAG laser light of 1.06 µm wavelength as the high-energy infrared laser light is transmitted through the hollow-core region 11, and a visible semiconductor laser light of 0.65 µm wavelength or a He—Ne laser light of 0.63 µm wavelength is transmitted through the solid portion 12 of the inner clad region 14 which is made of the pure silica.

When the outer clad region 15 has a refractive index lower than the inner clad region 14, the guide light is transmitted being subjected to total internal reflection at the boundary of the inner clad region 14 and the outer clad region 15. On the other hand, the high-energy laser light is transmitted with its optical energy confined mainly in the hollow-core region 11. The visible light is transmitted being confined in the hollow-core region 11 or the inner clad region 14.

Figure 1:
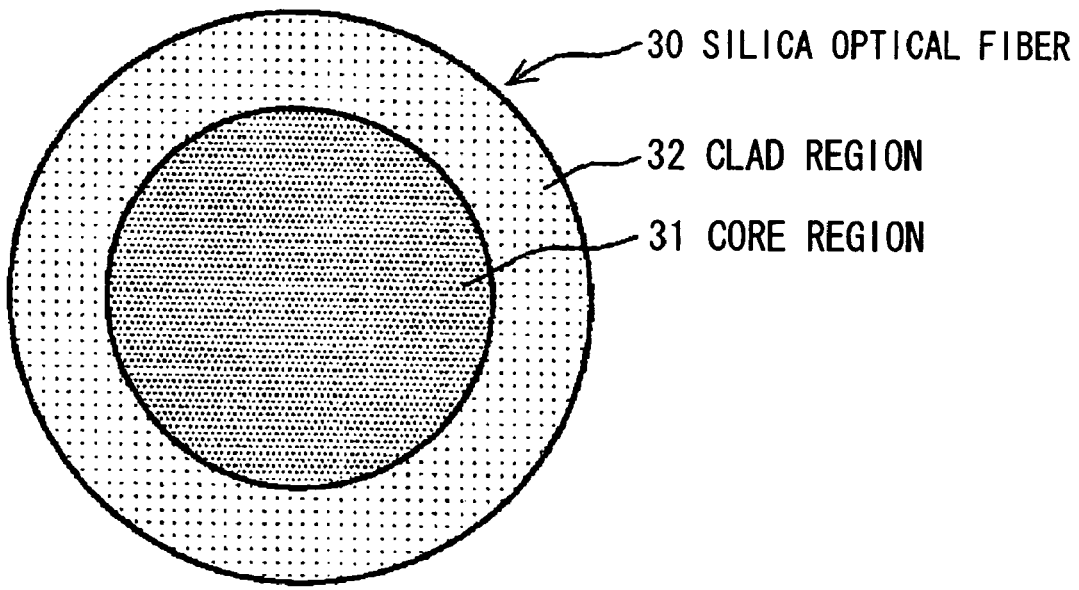
FIG. 1 is a cross sectional view showing the conventional laser energy transmission optical fiber with large diameter.
Figure 2:
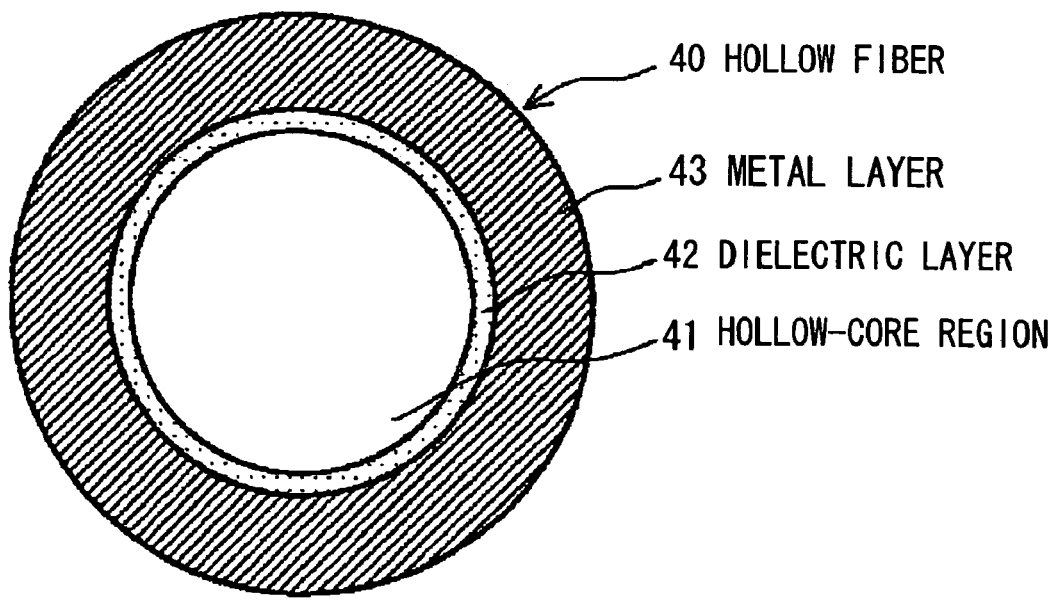
FIG. 2 is a cross sectional view showing a metallic hollow fiber with dielectric formed inside thereof.

In the optical fiber main body 10, both of the inner clad region 14 and the outer clad region 15 are fabricated such that they are made of the silica material. The optical fiber main body 10 can have a fiber diameter of 125 µm which is as large as the regular optical fiber. In spite of that the hollow-core region 11 serves to transmit the high-energy laser light, a threshold in fiber breakage can be brought to a very high value. Thus, as compared to the large diameter optical fiber as shown in FIG. 1, the optical fiber main body 10 is excellent in mechanical flexibility since it can be bent in a sufficient small bend diameter.

The laser energy transmission optical fiber of this embodiment is such that most of laser energy is transmitted through the hollow-core region 11. Therefore, the core can be prevented from breaking due to the self-focusing of light or the adhesion of foreign material even when a high-output and short-pulse laser light is transmitted therethrough with its large peak power defined spatially or temporally. Thus, the laser light can be stably transmitted and the visible guide light can be simultaneously transmitted at a low loss.

The outer clad region 15 may be made of a fluorine-containing resin. The fluorine-containing resin also can have a refractive index lower than the pure silica like the silica with fluorine added thereto. When the outer clad region 15 is made of the fluorine-containing silica, the optical fiber main body 10 can be formed by pulling an optical fiber base material which is integrated with the pure silica. When the outer clad region 15 is made of the fluorine-containing resin, the inner clad region 14 with the hollow-core region 11 can be formed by pulling the optical fiber base material made of pure silica and, in this process, the fluorine-containing resin can be coated on the inner clad region 14 to form the outer clad region 15.

The laser light of the infrared wavelength band to a 4 µm or less wavelength to be transmitted through the optical fiber main body 10 can be Ti-sapphire layer light, Ho—YAG laser light, Er-YAG laser light, ErCr-YSGG laser light etc. other than the Nd-YAG laser light.

Modification

The arrangement of the holes 13 in the optical fiber main body 10 can be modified.

Figure 4:
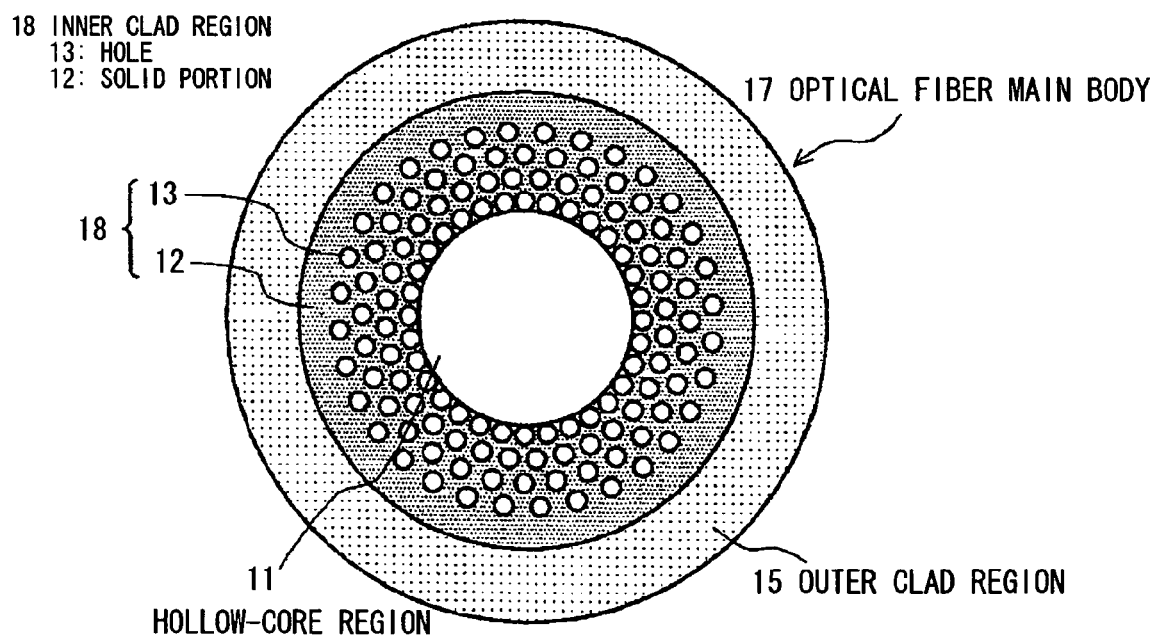
FIG. 4 is a cross sectional view showing a modification of the laser energy transmission optical fiber in FIG. 3.

FIG. 4 is a cross sectional view showing a modification of the laser energy transmission optical fiber in FIG. 3. As shown in FIG. 4, an optical fiber main body 17 in the modified embodiment can be have an inner clad region 18 that the holes 13 are formed at equal intervals on each of the concentric circles, and the respective holes on the neighboring concentric circles with different diameters in the radial direction are arranged being shifted each other, not being aligned. It is preferred that a hole on one of the neighboring concentric circles with different diameters in the radial direction are arranged being located at the midpoint of two holes on the other of the neighboring circles, as shown in FIG. 4.

Second Embodiment

Figure 5A:
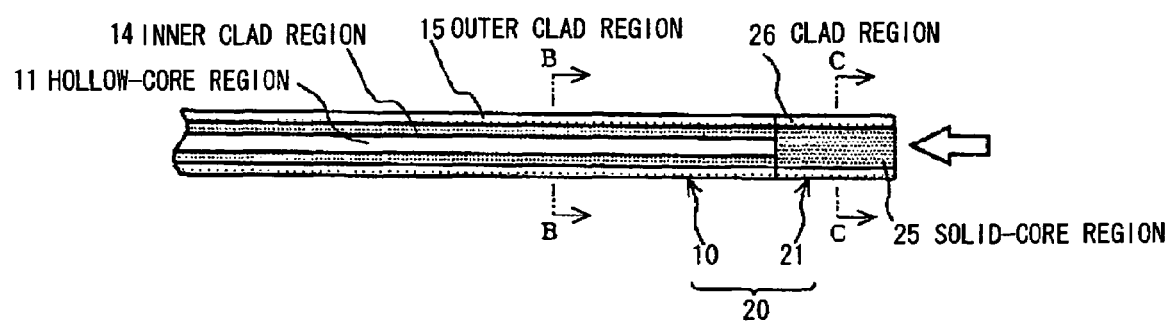
FIG. 5A is a longitudinal cross sectional view showing a laser energy transmission optical fiber in a second preferred embodiment according to the invention.
Figure 5B:
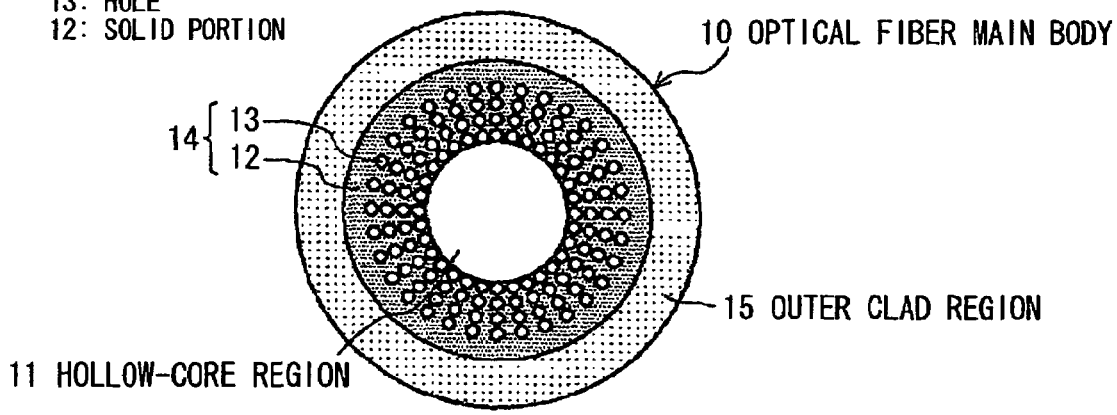
FIG. 5B is a cross sectional view cut along a line B-B in FIG. 5A.

FIG. 5A is a longitudinal cross sectional view showing a laser energy transmission optical fiber in the second preferred embodiment according to the invention. FIG. 5B is a cross sectional view cut along a line B-B in FIG. 5A, and FIG. 5C is a cross sectional view cut along a line C-C in FIG. 5A.

Figure 5C:
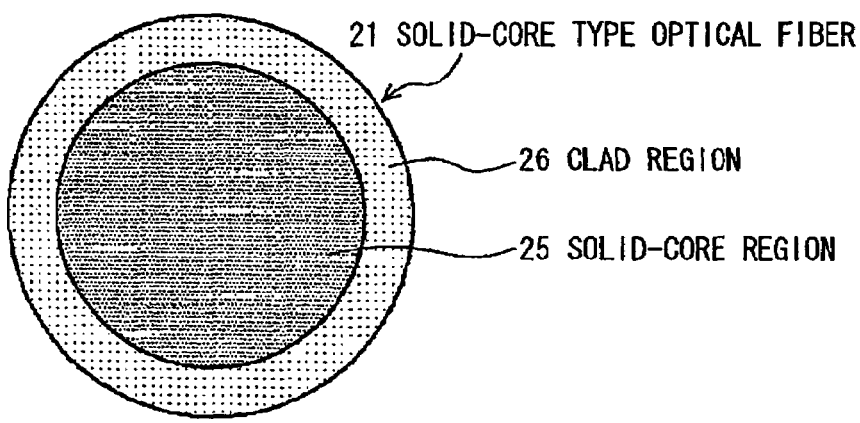
FIG. 5C is a cross sectional view cut along a line C-C in FIG. 5A.

As shown in FIGS. 5A to 5C, the laser energy transmission optical fiber 20 of this embodiment comprises the optical fiber main body 10 as shown in FIG. 3 and a solid-core type optical fiber 21 of short length.

In the laser energy transmission optical fiber 20, the solid-core type optical fiber 21 of short length is fusion-bonded to one or both ends of the optical fiber main body 10.

The solid-core type optical fiber 21 comprises a solid-core region 25, and a clad region 26 formed surrounding the solid-core region 25. In order that the solid-core region 25 can have a refractive index higher than the clad region 26, the solid-core region 25 is made of pure silica and the clad region 26 is made of fluorine-containing silica. The clad region 26 may be made of a fluorine-containing resin like the outer clad region 15.

The laser energy transmission optical fiber 20 of this embodiment also can be operated such that a red semiconductor laser light or He—Ne laser light is transmitted through the inner clad region 14 of the optical fiber main body 10 as well as the high-energy laser light. In order not to have a connection loss at the boundary of the solid-core type optical fiber 22 and the optical fiber main body 10, it is preferred that the solid-core region 25 of the solid-core type optical fiber 21 has a diameter nearly equal to that of the inner clad region 14 of the optical fiber main body 10.

By the composition of this embodiment, the tip portion of the optical fiber main body 10 can be sealed while securing sufficient emission energy. The optical fiber main body 10 with the tip sealed can keep a stable performance while protecting the end of the optical fiber main body 10, especially when the laser therapy is performed allowing the laser device to access or contact the affected part, or to be inserted into the body for minimally invasive treatment. Further, when the tip portion is contaminated, it can be easy cleaned and sterilized, and, thus, it can be reused for medical use.

In the solid-core type optical fiber 21, the laser light can be transmitted in total internal reflection like the regular communications optical fiber since the refractive index of the center part is higher than that of the peripheral part. When the transmitted laser light is an Er-YAG laser light, attenuation of laser energy can be reduced by shortening the length of the solid-type optical fiber up to about 1 to 2 cm.

Laser Energy Transmission Device

The laser energy transmission device in a preferred embodiment of the invention may comprise: the laser energy transmission optical fiber using the optical fiber main body 10 or 17 as shown in FIG. 3 or FIG. 4, or the laser energy transmission optical fiber 20 as shown in FIG. 5A; a first laser light source that oscillates a laser light of the infrared wavelength band to a 4 μm or less wavelength; and a second laser light source that oscillates a visible light of a 0.7 μm or less wavelength.

In order to oscillate the laser light of the infrared wavelength band to a 4 μm or less wavelength, it is preferred that the first laser light source is a titanium-sapphire (Ti-sapphire) laser light source, a neodymium-YAG (Nd-YAG) laser light source, a holmium-YAG (Ho-YAG) laser light source, an erbium-YAG (Er-YAG) laser light source, an erbium chrome-YSGG (ErCr-YSGG) laser light source etc.

In order to oscillate the visible light of a 0.7 μm or less wavelength, it is preferred that the second laser light source is a semiconductor laser light source, a helium-neon (He—Ne) laser light source etc.

As described, the laser energy transmission device of this embodiment can transmit the laser light of the infrared wavelength band to a 4 μm or less wavelength from the first laser light source and the visible laser light of a 0.7 μm or less wavelength from the second laser light source, by connecting the laser light sources with the above-mentioned laser energy transmission optical fiber. Further, the device can have the same functions and effects as the laser energy transmission optical fiber and the transmission method as described earlier.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A laser energy transmission optical method, comprising:
   providing a laser energy transmission optical fiber, said laser energy transmission fiber comprising:
      an optical fiber main body that comprises a hollow-core region comprising a diameter greater than a wavelength of transmitted light, an inner clad region comprising a solid portion with a plurality of holes formed therein, and an outer clad region formed surrounding the inner clad region,
   wherein the outer clad region comprises a refractive index lower than the solid portion of the inner clad region; and
   transmitting a laser light of the infrared wavelength band to a 4 μm or less wavelength while confining optical energy of the laser light mainly in the hollow-core region; and
   concurrently transmitting a visible laser light of a 0.7 μm or less wavelength while confining the visible light in the hollow-core region or inner clad region.

2. A laser energy transmission optical method, comprising:
   providing a laser energy transmission optical fiber, said laser energy transmission optical fiber comprising:
      an optical fiber main body that comprises a hollow-core region comprising a diameter greater than a wavelength of transmitted light, an inner clad region comprising a solid portion with a plurality of holes formed therein, and an outer clad region formed surrounding the inner clad region,
   wherein the outer clad region comprises a refractive index lower than the solid portion of the inner clad region; and
   a solid-core type optical fiber that is connected to one or both ends of the optical fiber main body,
   wherein the solid-core type optical fiber comprises a clad region, and a solid-core region comprising a refractive index greater than the clad region;
   transmitting laser light of the infrared wavelength band to a 4 μm or less wavelength while confining optical energy of the laser light mainly in the hollow-core region; and
   concurrently transmitting a visible laser light of a 0.7 μm or less wavelength while confining the visible light in the hollow-core region or inner clad region.

3. The laser energy transmission method according to claim 1, wherein:
   the laser light comprises a titanium-sapphire (Ti-sapphire) laser light, a neodymium-YAG (Nd-YAG) laser light, a holmium-YAG (Ho-YAG) laser light, an erbium-YAG (Er-YAG) laser light or an erbium chrome-YSGG (ErCr-YSGG) laser light.

4. The laser energy transmission method according to claim 2, wherein:
   the laser light comprises a titanium-sapphire (Ti-sapphire) laser light, a neodymium-YAG (Nd-YAG) laser light, a holmium-YAG (Ho-YAG) laser light, an erbium-YAG (Er-YAG) laser light, or an erbium chrome-YSGG (ErCr-YSGG) laser light.

5. The laser energy transmission method according to claim 1, wherein:

the visible laser light comprises a semiconductor laser light, or a helium-neon (He—Ne) laser light.

6. The laser energy transmission method according to claim 2, wherein:
the visible laser light comprises a semiconductor laser light, or a helium-neon (He—Ne) laser light.

7. A laser energy transmission method according to claim 1, further comprising:
providing a first laser light source that is operable to oscillate a laser light of the infrared wavelength band to a 4 μm or less wavelength; and
providing a second laser light source that is operable to concurrently oscillate a visible laser light of a 0.7 μm or less wavelength.

8. A laser energy transmission method according to claim 2, further comprising:
providing a first laser light source that is operable to oscillate a laser light of the infrared wavelength band to a 4 μm or less wavelength; and
providing a second laser light source that is operable to concurrently oscillate a visible laser light of a 0.7 μm or less wavelength.

9. The laser energy transmission method according to claim 7, wherein:
the first laser light source comprises a titanium-sapphire (Ti-sapphire) laser light source, a neodymium-YAG (Nd-YAG) laser light source, a holmium-YAG (Ho-YAG) laser light source, an erbium-YAG (Er-YAG) laser light source, or an erbium chrome-YSGG (ErCr-YSGG) laser light source.

10. The laser energy transmission method according to claim 8, wherein:
the first laser light source comprises a titanium-sapphire (Ti-sapphire) laser light source, a neodymium-YAG (Nd-YAG) laser light source, a holmium-YAG (Ho-YAG) laser light source, an erbium-YAG (Er-YAG) laser light source, or an erbium chrome-YSGG (ErCr-YSGG) laser light source.

11. The laser energy transmission method according to claim 7, wherein:
the second laser light source comprises a semiconductor laser light source, or a helium-neon (He—Ne) laser light source.

12. The laser energy transmission method according to claim 8, wherein:
the second laser light source comprises a semiconductor laser light source, or a helium-neon (He—Ne) laser light source.

* * * * *